US008682971B2

(12) United States Patent
Farrell et al.

(10) Patent No.: US 8,682,971 B2
(45) Date of Patent: Mar. 25, 2014

(54) RELATIONSHIP MANAGEMENT IN A SOCIAL NETWORK SERVICE (75) Inventors: Colm Farrell, Dublin (IE); Liam Harpur, Dublin (IE); Patrick Joseph O'Sullivan, Dublin (IE); Fred Raguillat, Meath (IE); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 12/820,404

(22) Filed: Jun. 22, 2010

(65) Prior Publication Data

US 2011/0314098 A1    Dec. 22, 2011

(51) Int. Cl.
*G06F 15/16* (2006.01)

(52) U.S. Cl.
USPC ........... 709/204; 709/203; 709/222; 709/224; 709/223

(58) Field of Classification Search
USPC .......................... 709/204, 203, 222, 224, 223
See application file for complete search history.

(56) References Cited

U.S. PATENT DOCUMENTS

| | | | |
|---|---|---|---|
| 6,980,870 B1 | 12/2005 | Mok et al. | |
| 7,269,590 B2 | 9/2007 | Hull et al. | |
| 7,366,759 B2 | 4/2008 | Trevithick et al. | |
| 7,539,697 B1 | 5/2009 | Akella et al. | |
| 7,617,207 B2 | 11/2009 | Jamison et al. | |
| 2003/0195853 A1* | 10/2003 | Mitchell | 705/51 |
| 2004/0122681 A1 | 6/2004 | Ruvolo et al. | |
| 2005/0080655 A1 | 4/2005 | Sengir et al. | |
| 2005/0283753 A1 | 12/2005 | Ho et al. | |
| 2007/0249410 A1 | 10/2007 | Patel et al. | |
| 2009/0024747 A1 | 1/2009 | Moses et al. | |
| 2009/0313346 A1 | 12/2009 | Sood et al. | |
| 2010/0005099 A1 | 1/2010 | Goodman et al. | |
| 2010/0097956 A1* | 4/2010 | Tauil et al. | 370/254 |
| 2010/0223212 A1* | 9/2010 | Manolescu et al. | 706/12 |

OTHER PUBLICATIONS

Mitchell-Wong, et al., Social Network Profile and Policy, 2008 9th IEEE Intl Workshop on Policies for Distributed Sys and Network, Palisades, NY, Jun. 2-4, 2008, p. 207-210.
Erlin et al., Students interactions in online asynchronous discussion forum: A social network analysis, 2009 Intl Conf on Education, Technology and Computer, Singapore, Apr. 17-20, 2009, p. 25-29.
Caldarelli et al., Preferential Exchange: Strengthening connections in complex networks, Physical Review E, vol. 70, No. 2, Aug. 2004, p. 27102.

* cited by examiner

*Primary Examiner* — Lan-Dai T Truong
(74) *Attorney, Agent, or Firm* — Steven L. Nichols; Van Cott, Bagley, Cornwall & McCarthy P.C.

(57) ABSTRACT

Managing relationships in a social network service implemented by at least one processor includes: establishing with the at least one processor a quantified interaction goal for at least a first party and a second party corresponding to a period of time; determining with the at least one processor, prior to an expiration of the period of time, that a current quantified accumulated interaction between the first party and the second party is inconsistent with the quantified interaction goal; and automatically performing a remedial action with the at least one processor to facilitate adjusting the quantified accumulated interaction between the first party and the second party to a level consistent with the quantified interaction goal.

24 Claims, 9 Drawing Sheets

Fig. 5C

RELATIONSHIP MANAGEMENT IN A SOCIAL NETWORK SERVICE

BACKGROUND

Aspects of the present invention relate to the field of social network services, and more particularly to the management of relationships among users of a social network service.

In a social network service, connections between individual users of the service exist based on one or more commonalities among the users. By providing a common communication medium and set of communication tools, social network services can greatly enhance and simplify the exchange of information among their users. Additionally, due to the fact that the relationships existing among users of social network services are often reflective of the relationships that exist among those users in real life, the enhanced exchange of information offered by social network services has proven to be effective in facilitating the development of personal and professional relationships.

In light of the benefits of social network services, it has become increasingly more common for businesses and other organizations to utilize specialized social network services to facilitate the efficient dissemination of information and collaboration on projects by their members. For example, an organization having various projects to accomplish may operate a social network service that implements a separate group for each project. In this way, members of a team assigned to a specific project may collaborate with other members of the team in an organized and orderly manner about the progress on the project.

BRIEF SUMMARY

A method of managing relationships in a social network service implemented by at least one processor includes: establishing with the at least one processor a quantified interaction goal for at least a first party and a second party corresponding to a period of time; determining with the at least one processor, prior to an expiration of the period of time, that a current quantified accumulated interaction between the first party and the second party is inconsistent with the quantified interaction goal; and automatically performing a remedial action with the at least one processor to facilitate adjusting the quantified accumulated interaction between the first party and the second party to a level consistent with the quantified interaction goal.

A method of managing relationships in a social network service implemented by at least one processor includes: establishing with the at least one processor a quantified interaction goal for at least a first party and a second party corresponding to a period of time; tracking with the at least one processor a current accumulated interaction score for a relationship between the first party and the second party as a sum of weighted interaction values assigned to previously performed activities in the period of time involving communication between the first party and the second party; determining with the at least one processor, prior to an expiration of the period of time, that the current accumulated interaction score is inconsistent with the quantified interaction goal; and automatically performing a remedial action with the at least one processor to facilitate adjusting the current accumulated interaction score between the first party and the second party to a value consistent with the quantified interaction goal.

A system includes a processor and a memory communicatively coupled to the processor. The memory has executable code stored thereon such that the processor, upon executing the executable code, is configured to: establish a quantified interaction goal for at least a first party and a second party corresponding to a period of time; determine, prior to an expiration of the period of time, that a current quantified accumulated interaction between the first party and the second party is inconsistent with the quantified interaction goal; and automatically perform a remedial action to facilitate adjusting the quantified accumulated interaction between the first party and the second party to a level, consistent with the quantified interaction goal.

A computer program product for managing relationships in a social network service includes a computer readable storage medium having computer readable program code embodied therewith. The computer readable program code includes: computer readable program code configured to establish a quantified interaction goal for at least a first party and a second party corresponding to a period of time; computer readable program code configured to determine, prior to an expiration of the period of time, that a current quantified accumulated interaction between the first party and the second party is inconsistent with the quantified interaction goal; and computer readable program code configured to automatically perform a remedial action to facilitate adjusting the quantified accumulated interaction between the first party and the second party to a level consistent with the quantified interaction goal.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification discloses methods and systems for managing relationships in a social network service by establishing a quantified interaction goal for two or more parties in a specified period of time, determining prior to the expiration of the period of time whether a current accrued quantified interaction between the parties is consistent with the quantified interaction goal, and automatically performing a remedial action through the social network service to facilitate adjusting the current accrued quantified interaction between the parties to level more consistent with the quantified interaction goal. Thus, the systems and methods provided herein may prevent relationships in the social network service from experiencing too little or too much interaction according to the nature of the relationships.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As used in the present specification and in the appended claims, the term "social network service" refers to a software entity executed by a host processor that implements individual representations of individual users of the software entity and models relationships between the individual users.

Figure 1:
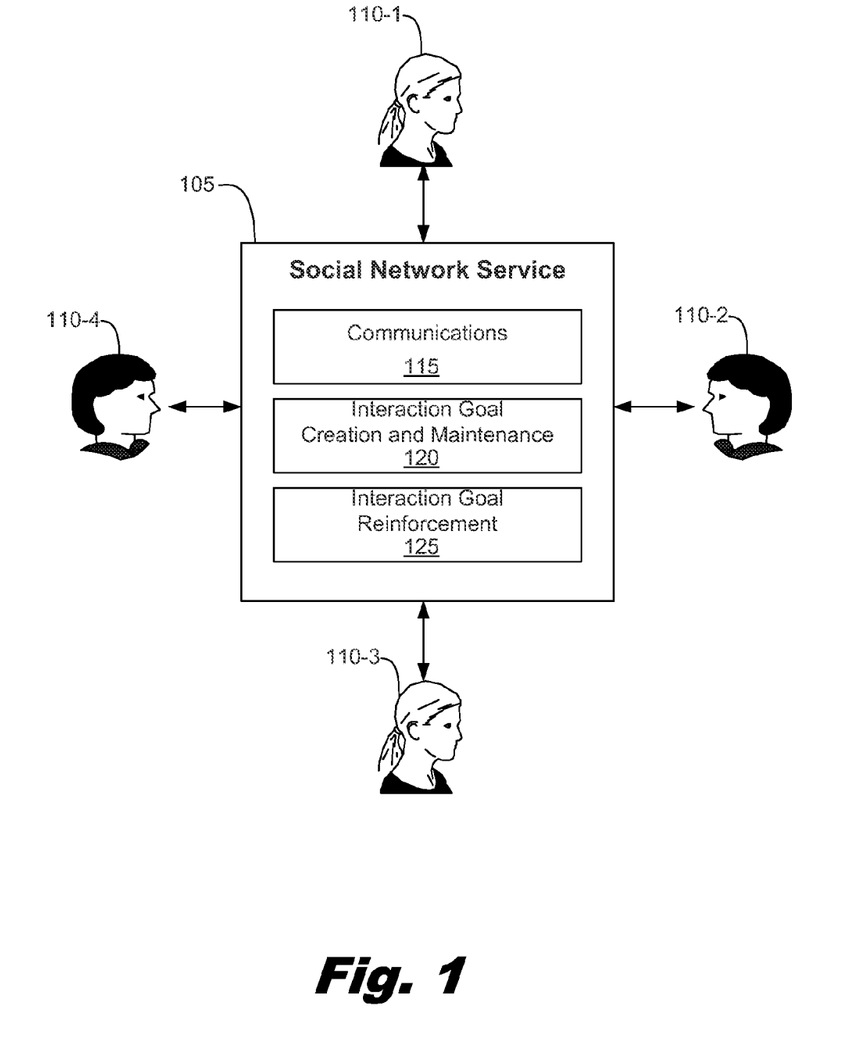
FIG. 1 is a block diagram of an illustrative social networking platform, according to one exemplary embodiment of principles described herein.

With reference now to FIG. 1, a block diagram of an illustrative social network service (105) is shown. The social network service (105) is implemented by one or more computers and accessible to users (110-1 to 110-4). For example, the social network service (105) may be available to the users (110-1 to 110-4) through a server on a network that interacts with one or more client devices through which the users (110-1 to 110-4) may receive information from and transmit information to the social network service (105) through a generic web browser or specialized software. Alternatively, the social network service (105) may be implemented by the same computing device to which the users (110-1 to 110-4) log on to access the social network service (105).

Each of the users (110-1 to 110-5) may have a profile or similar representation of himself or herself stored by the social network service (105). Through mutual access to the social network service (105), the users (110-1 to 110-4) may form relationships and communicate with each other through tools provided by the social network service (105). The social network service (105) may store a model of each such relationship. However, not all relationships may be inherently alike. For example, the social network service (105) may be a specialized social network service (105) operated by a large corporation to facilitate communication among employees assigned to different projects or areas of expertise. Thus, where user (110-1) is a supervisor to users (110-2, 110-3) in the organization, the nature of the relationship between user (110-1) and user (110-2) or user (110-3) may be classified differently within the social network service (105) than the relationship between user (110-2) and his peer user (110-3).

Additionally, where user (110-4) is a mentor within the organization to user (110-2), the relationship between user (110-4) and user (110-2) modeled within the social network service (105) may be inherently different than the relationship between user (110-2) and supervisor user (110-1) or peer user (110-3).

The nature of the relationship modeled between two users (110-1 to 110-4) in the social network service (105) may have bearing on how the users (110-1 to 110-4) are permitted to interact with each other through the social network service (105).

The social network service (105) of the present example may be configured to implement at least three basic modules of functionality: a communications module (115), a social interaction an interaction goal creation and maintenance module (120), and an interaction goal reinforcement module (125).

The communications module (115) provides the functional backbone through which users (110-1 to 110-4) communicate with each other through various communication services provided by the social network service (105). Examples of communication services that may be provided by the social network service (105) include, but are not limited to, email services, instant messaging services, group chat services, video chat services, videoconferencing services, telephone services, Voice Over Internet Protocol (VOIP) services, remote desktop services, bulletin board services, file sharing services, file collaboration tools, profile "wall" services, commenting services, and the like.

However, the availability of each of the communication services implemented by the social network service (105) for communication between two users (110-1 to 110-4) may depend on the relationship between those users (110-1 to 110-4). For example, where user (110-4) is a mentor of user (110-2) but is not a member of a particular project on which user (110-2) is working, user (110-4) may not be permitted to view files shared by user (110-2) related to the project. Moreover, where user (110-1) and user (110-4) have no defined relationship in the social network system (105), these users (110-1) and (110-4) may not be permitted to, for example, instant message each other or access any of each other's files.

The interaction goal creation and maintenance module (120) is configured to create and store quantified interaction goals between two or more users (110-1 to 110-4). Thus, in the present example, a target interaction goal may be expressed as a numeric value with respect to a certain period of time to reflect a desired level of interaction between two or more users (110-1 to 110-4) within that period of time. For instance, various types of interaction activities tracked by the social network service (105) may be assigned weighted amounts of interaction value, and a quantified interaction goal may specify a total aggregate score based on the interaction value accumulated from interaction activities between two or more users (110-1 to 110-4) within a specified time period.

The interaction goal creation and maintenance module (120) tracks interactions between users (110-1 to 110-4) with respect to the quantified interaction goals. Continuing the above example, the interaction goal creation and maintenance module (120) may be configured to track a current quantified accumulated interaction between users (110-1 to 110-4) having a quantified interaction goal in place. Continuing the above example, the interaction goal creation and maintenance module (120) may track certain social interactions between the employee user (110-2) and the supervisor user (110-1) throughout the given month and determine at various instances in the month whether the current quantified accumulated interaction for the relationship between the employee user (110-2) and the supervisor user (110-1), measured as an accumulated score, is on track to reach the quantified interaction goal goal by the end of the month.

The interaction goal reinforcement module (125) performs remedial functions as needed throughout the specified time period to facilitate adjusting the quantified accumulated interaction between two or more users (110-1 to 110-4) to a level more consistent with the quantified social interaction goal for that time period. Continuing the above example, if it is determined during the specified month that the current accumulated interaction between the employee user (110-2) and the supervisor user (110-1) is not on track to reach the quantified interaction goal by the end of the month, the interaction goal reinforcement module (125) may automatically perform an action intended to stimulate traceable interaction between the employee user (110-2) and the supervisor user (110-1). For instance, the interaction goal reinforcement module (125) may be configured to prompt the supervisor user (110-1) to schedule a face-to-face meeting with the employee user (110-2) or to initiate a video chat with the employee user (110-2).

The creation, tracking, and reinforcement of quantified interaction goals will be explained in more detail with respect to later figures of the present specification.

Figure 2:
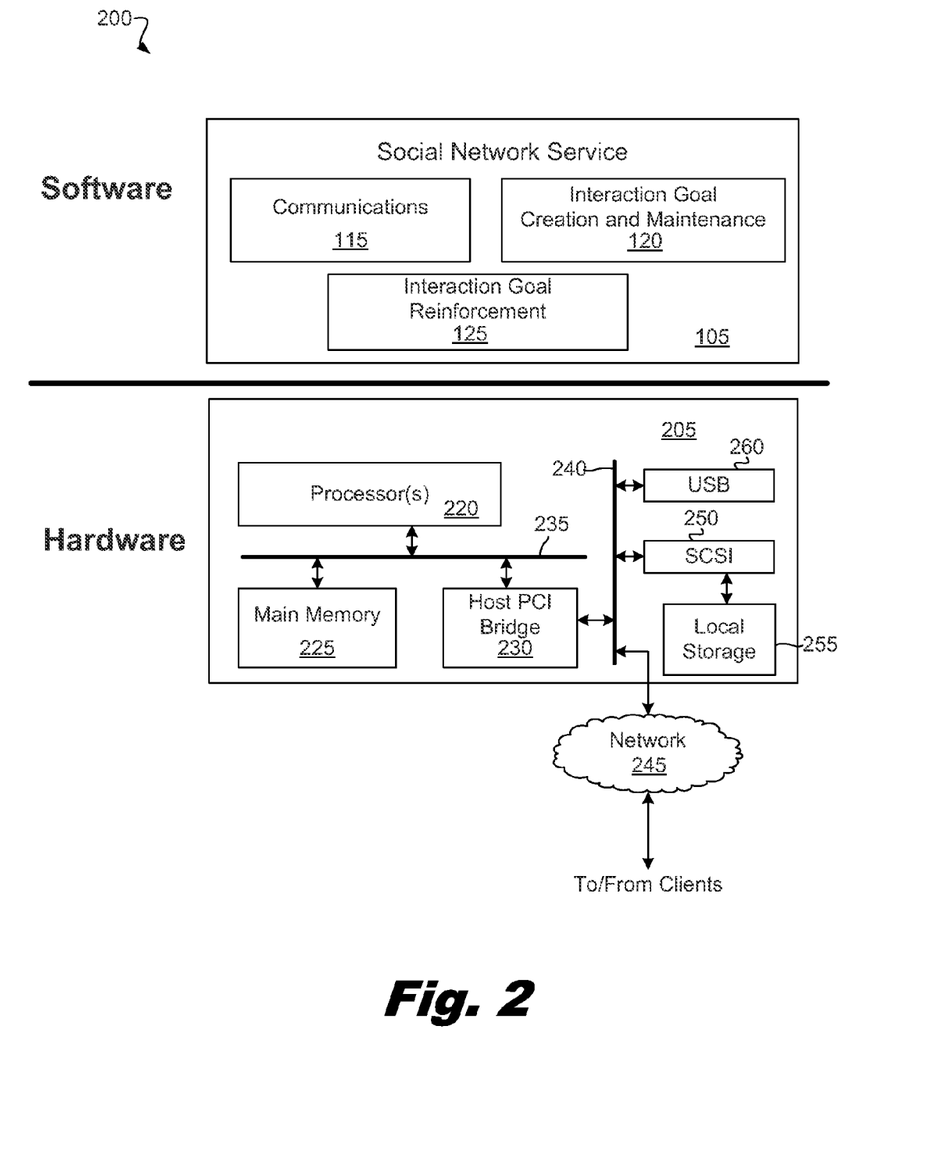
FIG. 2 is a block diagram of an illustrative system for implementing a social networking platform, according to one exemplary embodiment of principles described herein.

FIG. 2 is a block diagram of an illustrative computing system (200), such as a server, in which an underlying hardware platform (205) executes software to implement a social network service (105), according to one exemplary embodiment of principles described herein.

The hardware platform (205) of the computing system (200) may include at least one processor (220) that executes code stored in the main memory (225). In certain embodiments, the processor (220) may be a multi-core processor having multiple independent central processing units (CPUs), with each CPU having its own L1 cache and all CPUs sharing a common bus interface and L2 cache. Alternatively, the processor (220) may be a single-core processor.

The at least one processor (220) may be communicatively coupled to the main memory (225) of the hardware platform and a host peripheral control interface bridge (PCI) (230) through a main bus (235). The main memory (225) may include dynamic non-volatile memory, such as random access memory (RAM). The main memory (225) may store executable code and data that is obtainable by the processor (220) through the main bus (235).

The host PCI bridge (230) may act as an interface between the main bus (235) and a peripheral bus (240) used to communicate with peripheral devices. Among these peripheral devices may be a network interface configured to communicate with an external network (245), a Small Computer System Interface (SCSI) (250) for communicating with local storage devices (255), and a Universal Serial Bus (USB) interface (260) for communicating with USB devices.

It will be readily apparent to those having skill in the art that the present configuration of the hardware platform (205) is merely illustrative of one type of hardware platform (205) that may be used in connection with the principles described in the present specification. Moreover, it will be further apparent that various modifications, additions, and deletions to the hardware platform (205) shown are conceivable and anticipated by the present specification.

The social network service (105) implemented by the hardware platform (205) may exhibit the functionality of the communications module (115), the interaction goal creation and maintenance module (120), and the interaction goal reinforcement module (125) discussed above with respect to FIG. 1. Various users of the social network service (105) may interact with the social network service (105) using client machines communicatively coupled to the hardware platform (205) through the network (245) or by using the hardware platform (205) directly.

Figure 3:
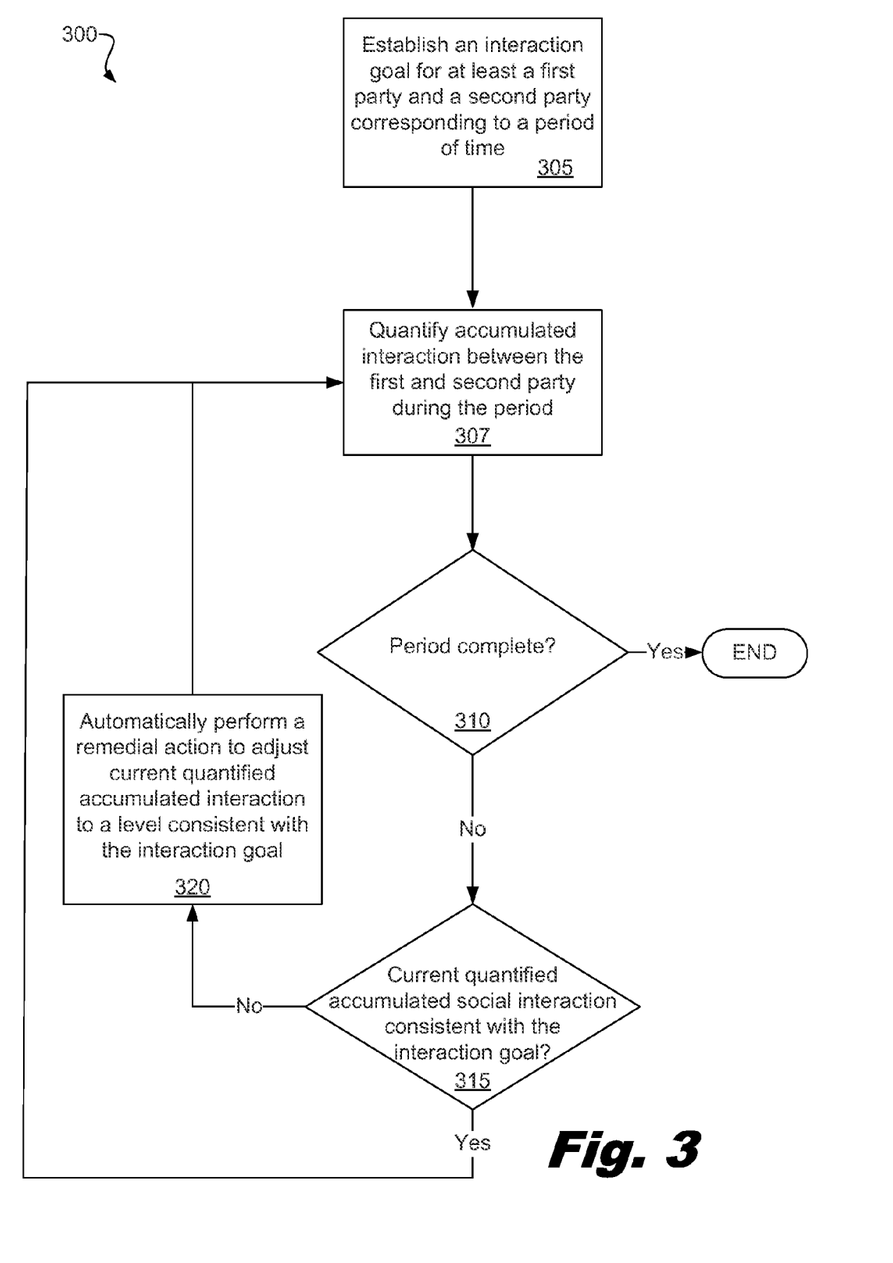
FIG. 3 is a flow diagram showing an illustrative method of relationship management in a social network, according to one exemplary embodiment of principles described herein.

FIG. 3 shows a block diagram of an illustrative method (300) for managing relationships in a social network service. The illustrative method (300) may be performed, for example, by the social network service (105) described in FIG. 1 as implemented by the hardware platform (205) described in FIG. 2.

To begin, a quantified interaction goal is established (step 305) for at least a first party and a second party that corresponds to a period of time. The quantified interaction goal may be expressed, for example, as a goal for an aggregate interaction score to be accumulated by the expiration of the period of time, where the aggregate interaction score is based on the weighted value of the various types of interaction activities between the first and second parties.

In certain examples, the interaction value associated with an interaction activity may be based on the type and/or quality of interaction between the parties during that activity. Thus, in one scenario an email between the parties may contribute less to the aggregate interaction score than an instant messaging conversation, and an instant messaging conversation may contribute less to the total aggregate interaction score than a telephone contact or a face-to-face meeting between the parties.

In many cases, the social network system will also provide the application framework through which the interactions occur. For example, the social network may be configured to provide an email system, an instant messaging service, a voice/telephone communications service, a teleconferencing service, and a calendar application for appointments. Thus, the social network system may dynamically quantify (step 307) the accumulated interaction between the parties throughout the specified period as traceable interaction events occur and/or are reported by the parties.

Prior to the expiration of the period (decision 310, NO), the social network service may be configured to perform one or more evaluations (decision 315) as to whether the current quantified accumulated social interaction is consistent with the interaction goal set for the parties. For example, if the parties are on track to achieve their quantified interaction goal by the expiration of the period, it may be determined (decision 315, YES) that the current quantified accumulated social interaction is consistent with the quantified interaction goal and no remedial action will be taken by the social network service. However, each time it is determined (decision 315, NO) that the current quantified accumulated social interaction is not consistent with the quantified interaction goal, the social network service may automatically perform (step 320) a remedial action to facilitate adjusting the current quantified accumulated to a level more consistent with the quantified interaction goal.

For example, if more interaction is needed between the parties in order to reach the quantified interaction goal by the expiration of the period, the social network service may prompt one or more of the parties to initiate or schedule a traceable interaction activity between the parties, or the social network may automatically initiate or schedule a traceable interaction activity between the parties. Similarly, if less interaction is needed between the parties, the social network service may prompt one or more of the parties to reduce interaction with the other party or parties, or the social network service may automatically reduce the amount of interaction between the parties through the social network service (e.g.; automatically defer instant messages to a low-priority portion of an inbox, switch telephone calls between the parties to voicemail, prevent scheduling of meetings, etc.).

At the expiration of the period (decision 310, YES), the value of the quantified accumulated interaction will be reset and a new period of quantified interaction accumulation will begin for the relationship using either the same quantified interaction goal or a new quantified interaction goal. A report may be generated by the social network service showing the quantified interaction goal and accumulated quantified interaction for a relationship over one or more periods. The report may be automatically generated and sent to persons having stewardship over the relationship on a regular basis (e.g., at the expiration of each period, at the end of each quarter, etc.).

In certain examples, the nature of the relationship between the parties for which the quantified interaction goal is set may have a great deal of bearing on how the quantified interaction goal is reinforced by the social network service. Thus, for certain types of relationships where a large amount of interaction between the parties is preferred, the social network service may only perform remedial actions that increase interaction between the parties. Conversely, for relationships where too much interaction between the parties is a concern, the social network service may only perform remedial actions decrease the amount of interaction between the parties consistent with the goal.

In certain examples, quantified interaction goals may be one-sided such that each party in a relationship has a separate aggregate interaction score goal for that relationship. For instance, in a relationship between user A and user B, user A may have a goal that is different from a goal for B for the same month. Thus, user A and user B would accumulate aggregate interaction scores separately. In this type of system, all interaction activities that contribute to the aggregate interaction score associated with user A would not necessarily contribute to the aggregate interaction score associated with user B. For instance, in certain embodiments user A may contribute to his aggregate interaction score by sending an email to user B, but user B may not contribute to her aggregate interaction score for receiving the email sent by user A. Nevertheless, some activities may allow both users to contribute to their respective quantified interaction goals, such as face-to-face meetings or telephone calls.

Additionally or alternatively, a quantified interaction goal may be set for all parties of a relationship such that an aggregate interaction score is earned together by the parties through participation in interaction activities.

In short, a quantified interaction goal for a relationship may be a) applicable to only a single party in a relationship between that party and one or more other parties, b) specific to only a subset of the parties in a multi-party relationship, or c) applicable to all parties in a multi-party relationship.

The contribution to an aggregate interaction score achieved by participating in interaction activities may vary based on many different types of criteria. For instance, in certain systems one of the parties may be permitted to award bonus value to an interaction activity when the interaction activity has been particularly helpful or productive. The bonus value would cause that interaction activity to contribute to an aggregate interaction score above the ordinary amount specified for that particular interaction activity. In certain examples, the ability to award bonus value may be subject to per-exchange and/or time period limits. In certain examples, a third party may set bonus value for a particular communication with a particular party in a multi-party relationship—e.g., a manager may offer bonus interaction value to members of a team who interact with a new hire within the first three months of that the new hire is a member of the team. The amount of bonus interaction value awarded may be based on the recipient (i.e., the new hire) or the identity of the person engaging the recipient.

Additionally, in certain social network services, an aggregate interaction score may be pooled among two or more users. Thus, where user A has a quantified interaction goal with user C and user B also has a quantified interaction goal with user C, it may be permissible to allow user A and user B to meet their respective quantified interaction goals based on a total combined amount of interaction with user C in a particular month.

Furthermore, in certain social network services, a user may have a quantified interaction goal that reflects an overall goal of accumulated interactions with multiple people. For example, user A may have a quantified goal of for interactions with user B, user C, and user D. In this scenario, it may be possible for user A to meet his goal by accumulating a substantial amount of quantified social interaction with user B while interacting less with Users C and D.

Additionally, different types of interaction activities may differently to the quantified according to the nature of the relationship between the parties engaged in the interaction. For example, a mentor-mentee relationship between two parties may be configured such that instant message exchanges between the parties do not contribute toward the quantified interaction goal to encourage more face-to-face dialog between the parties. By contrast, a supervisor-supervisee relationship between two parties may be configured to award more interaction value to email and instant messaging dialog than face-to-face meetings to discourage frequent, unproductive meetings.

Figure 4A:
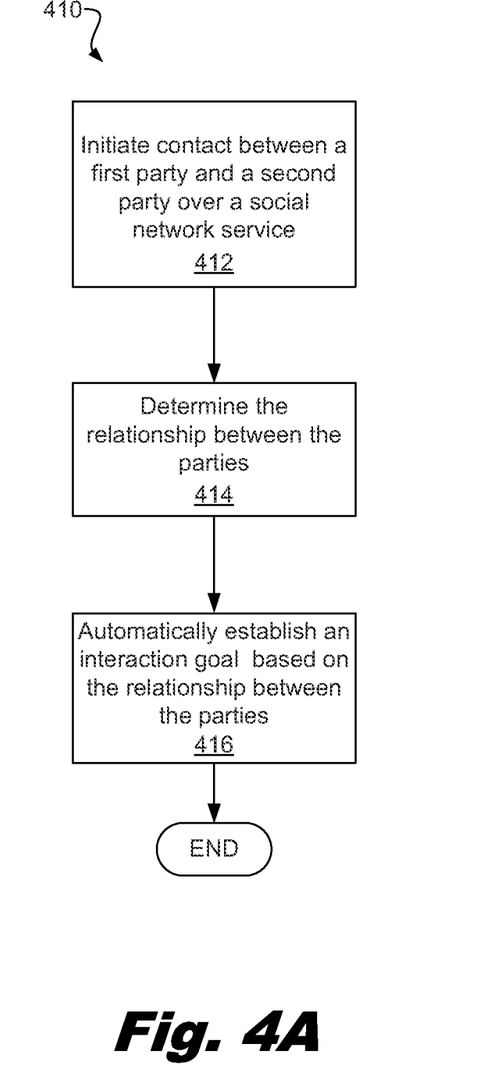
FIGS. 4A, 4B, and 4C are flow diagrams showing illustrative methods of establishing a quantified interaction goal in a social network, according to one exemplary embodiment of principles described herein.
Figure 4B:
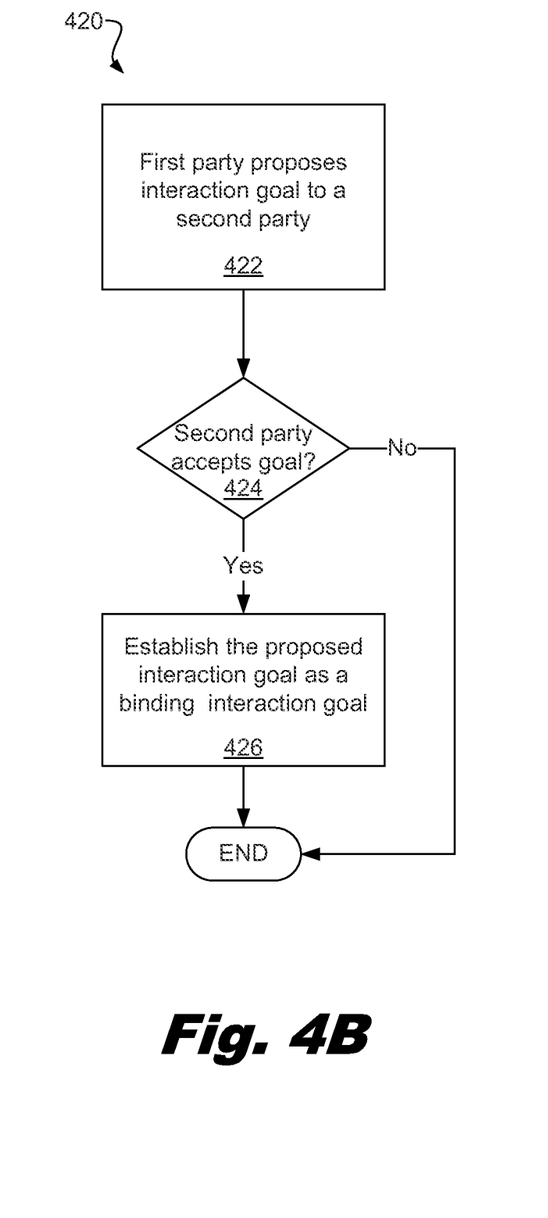
Figure 4C:
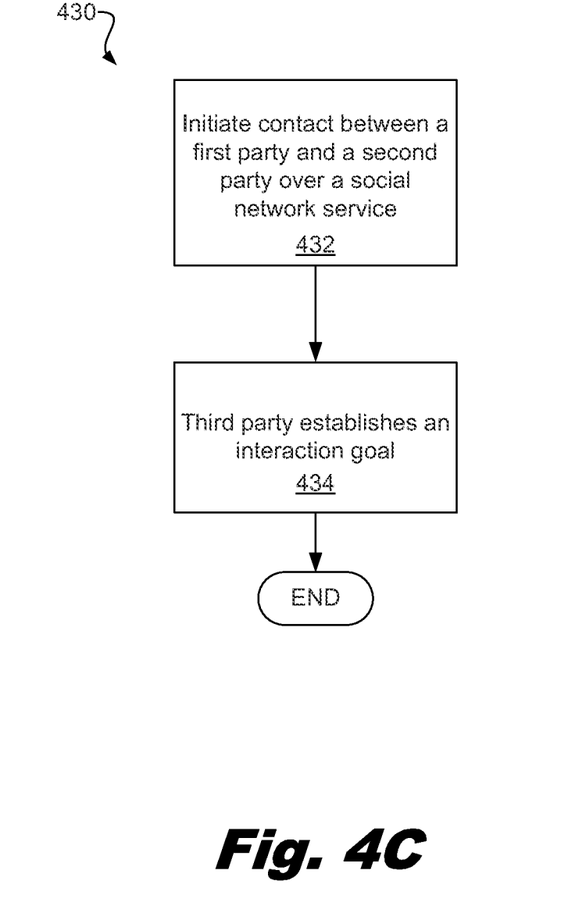

Referring now to FIGS. 4A, 4B, and 4C, various alternative illustrative methods (410, 420, 430) are shown for establishing the initial value of a quantified interaction goal for a relationship. For the sake of clarity, each of these illustrative methods (410, 420, 430) is described in the context of a relationship between only two parties. However, it will be readily understood that the following principles may also be applied to establishing quantified interaction goals for relationships composed of more than two parties.

In FIG. 4A, contact is initiated (step 412) between a first party and a second party over a social network service, the social network service determines (step 414) the relationship between the two parties, and the social network service automatically establishes (step 416) a quantified interaction goal based on the relationship between the parties. The relationship between the two parties may be determined (step 414) based on membership in a team or project, geography, location, organizational role, organizational distance, and any other criteria that may suit a particular application of the principles described herein. When the relationship is characterized by the social network service, the social network service may automatically establish a predetermined value as the quantified interaction goal based on a lookup table or algorithm. Alternatively, the social network service may merely establish a minimum and/or maximum value for the quantified interaction goal based on the relationship between the two parties and simply enforce the selection of a value for the quantified interaction goal within the predetermined range.

In FIG. 4B, a first party proposes (step 422) a quantified interaction goal to a second party over the social network service. This proposition may take place immediately after contact is initiated between the two parties or at any other suitable time. The proposed quantified interaction goal is only established (step 425) as binding on the condition that the second party accepts (decision 424, YES) the proposed quantified interaction goal.

In FIG. 4C, contact is initiated (step 432) between a first party and a second party over a social network service, and a third party establishes (step 434) a quantified interaction goal. For example, an administrator or supervisor of the first and second party may determine an appropriate level of interaction between the two parties based on the relationship between the two parties and set the quantified interaction goal accordingly.

Additionally or alternatively, to the embodiments shown in FIGS. 4A, 4B, and 4C, it should be understood that other criteria may be used to determine the value of the quantified interaction goal. For example, the time of year during which the period set for the goal occurs may bear on the feasibility of interaction between parties in a relationship. Thus, a quantified interaction goal for parties in a relationship may be lower during summer months or holiday periods than at other times of the year. Moreover, any other criterion may be used to determine the value of the quantified interaction goal corresponding to a given relationship that may suit a particular application of the principles described herein.

It should also be understood that in certain applications of the principles described herein, a quantified interaction goal for a relationship may be dynamically changed during the applicable period by one or more of the parties to the relationship, by the social network service, or by a party outside of the relationship. For example, if a first party in a relationship feels that the frequency of interaction with a second party is too frequent, the first party may adjust the quantified interaction goal for the relationship between the first party and the second party to a lower value. Doing so may invoke automatic remedial actions performed by the social network service to reduce the interaction between the first party and the second party to a level more consistent with the new quantified interaction goal. Such remedial action may include, but is not limited to, diverting incoming instant messages and emails from the second party to a lower priority inbox of the first party, automatically sending calls from the second party to voicemail, preventing the second party from inviting the first party to a scheduled meeting, and/or any other suitable remedial action.

Figure 5A:
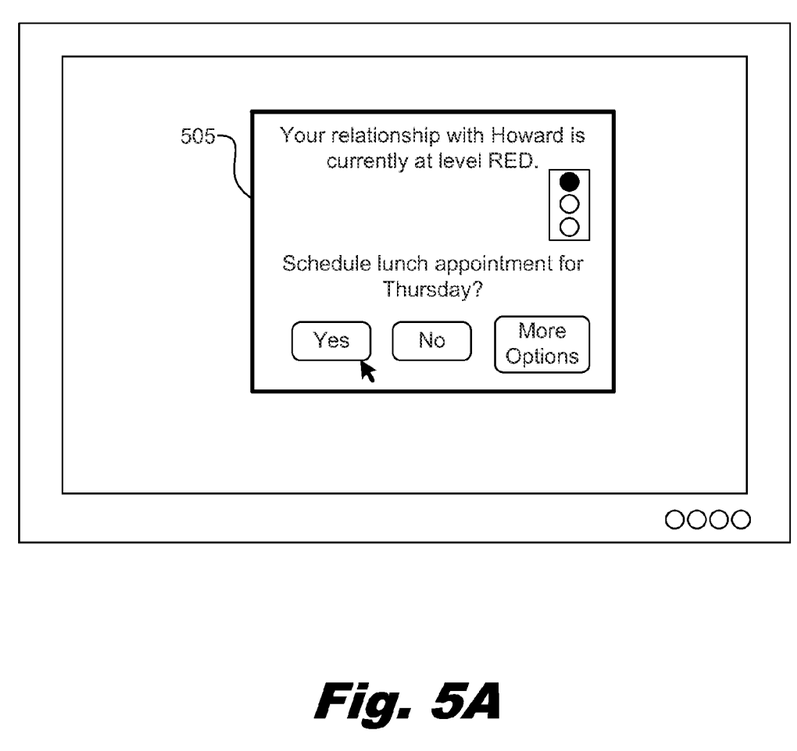
FIGS. 5A, 5B, and 5C show different illustrative remedial actions taken by a social network service to increase interaction between two parties according to one exemplary embodiment of principles described herein.
Figure 5B:
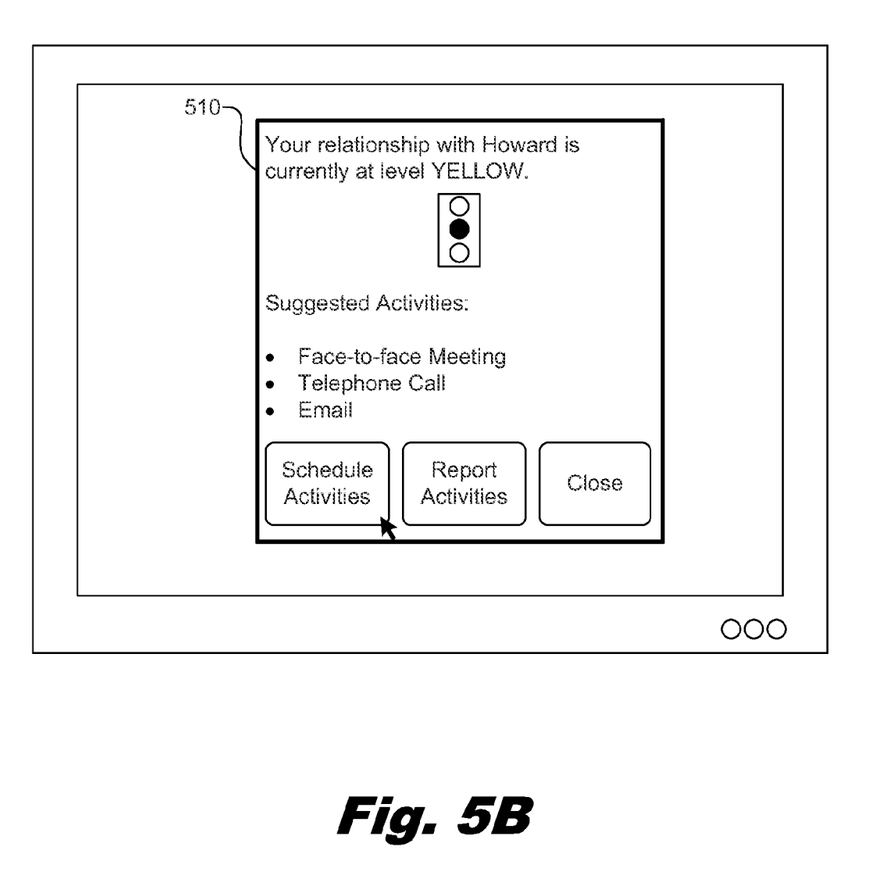
Figure 5C:
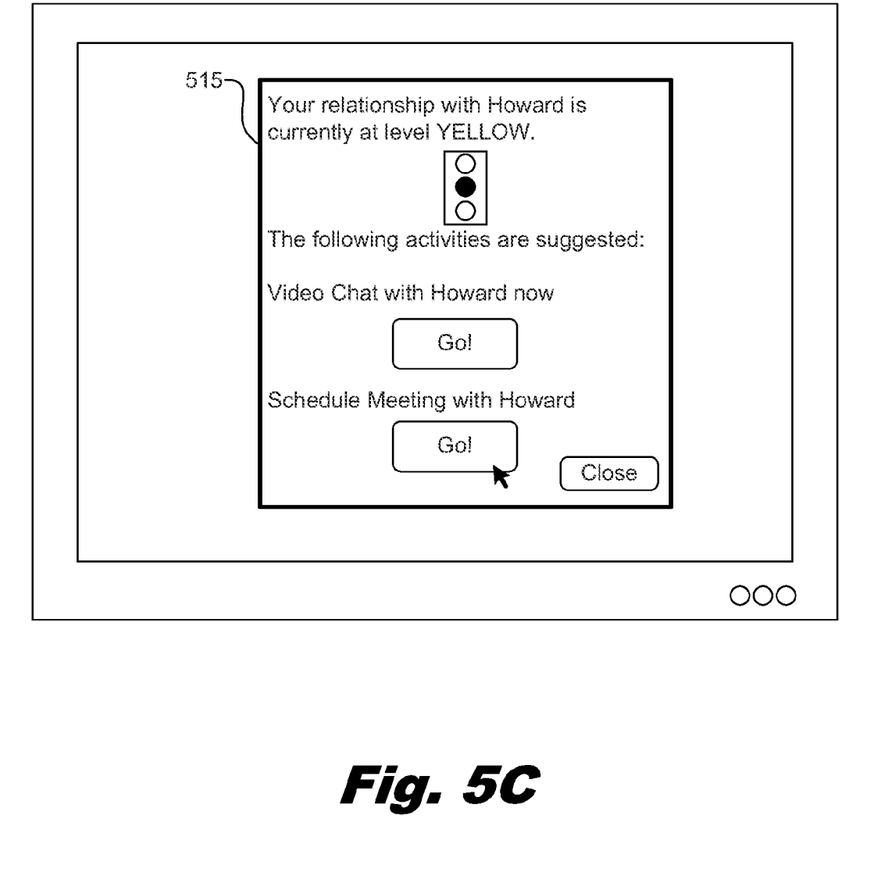

FIGS. 5A, 5B, and 5C show different approaches to automatic remedial actions to facilitate an increase in the level of quantified accumulated interaction between two parties in a relationship, consistent with a quantified interaction goal for a time period according to the principles described herein. While the remedial actions shown in FIGS. 5A, 5B, and 5C are onscreen popup reminders or prompts, the present specification also any other type of automatic remedial action that may be taken to facilitate an increase in the level of quantified accumulated interaction between two parties in a relationship consistent with a quantified interaction goal. Examples of other such approaches to automatic remedial action include, but are not limited to, automatic email reminders, automatic appointment scheduling, automatic voicemail reminders, automatic SMS text messages, automatic instant message initiation, automatic video chat initiation, automatically printed documents, and the like.

FIG. 5A illustrates an onscreen popup window (505) controlled by a social network service that reminds a first party that the first party is not on track to reach a quantified interaction goal with a second party and prompts the first party to schedule a lunch appointment with the second party at a time that is mutually convenient to the parties based on a calendar maintained by the social network service. Alternatively, this popup window (505) may be replaced by an email reminder, an automated telephone call, an automatic invitation to the lunch appointment in the calendar service implemented by the social network service, or any other method that may suit a particular application of the principles described herein.

FIG. 5B illustrates an onscreen popup window (510) controlled by a social network service that reminds a first party that the first party is not on track to reach a quantified interaction goal with a second party, reminds the first party of how quantified interaction may be accumulated with the second party, and prompts the first party to either enter a menu where the social network service prevents a convenient interface for arranging interaction between the parties, report value-contributing interaction activates that have not yet been recorded in the social network service, or ignore the reminder.

FIG. 5C illustrates an onscreen popup window (515) controlled by a social network service that reminds a first party that the first party is not on track to reach a quantified interaction goal with a second party, reminds the first party of how quantified interaction may be accumulated with the second party, and prompts the first party to with multiple one-click solutions for initiating value-earning interaction with the second party.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of managing relationships in a social network service implemented by at least one processor, said method comprising:
    establishing with said at least one processor a quantified interaction goal for at least a first party and a second party corresponding to a period of time;
    determining with said at least one processor, prior to an expiration of said period of time, that a current quantified accumulated interaction between said first party and said second party is inconsistent with said quantified interaction goal; and
    automatically performing a remedial action with said at least one processor to facilitate adjusting said quantified accumulated interaction between said first party and said second party to a level consistent with said quantified interaction goal.

2. The method of claim 1, wherein said automatically performing a remedial action with said at least one processor to facilitate adjusting said accumulated interaction between said first party and said second party to a level consistent with said quantified interaction goal further comprises:
    prompting at least one of said first party and said second party to initiate an interaction activity between said first party and said second party.

3. The method of claim 2, wherein said automatically performing a remedial action with said at least one processor to facilitate adjusting said accumulated interaction between said first party and said second party to a level consistent with said quantified interaction goal further comprises:
    initiating an interaction activity between said first party and said second party.

4. The method of claim 2, wherein said automatically performing a remedial action with said at least one processor to facilitate adjusting said accumulated interaction between said first party and said second party to a level consistent with said quantified interaction goal further comprises:
    reducing access by one of said first party and said second party to the other of said first party and said second party.

5. The method of claim 1, wherein said establishing with said at least one processor a quantified interaction goal for at least a first party and a second party corresponding to a period of time further comprises:
    establishing said quantified interaction goal at an initial creation of a relationship between said first party and said second party through said social network service implemented by said at least one processor.

6. The method of claim 1, wherein said establishing with said at least one processor a quantified interaction goal for at least a first party and a second party corresponding to a period of time further comprises:
    automatically determining a value for said quantified interaction goal based on a relationship between said first party and said second party through said social network service implemented by said at least one processor.

7. The method of claim 1, wherein said establishing with said at least one processor a quantified interaction goat for at least a first party and a second party corresponding to a period of time further comprises:

receiving a proposed quantified interaction goal from said first party;

determining whether said second party consents to said proposed quantified interaction goal; and establishing said proposed quantified interaction goal as said quantified interaction goal if said second party consents to said proposed quantified interaction goal.

8. The method of claim 1, wherein said establishing with said at least one processor a quantified interaction goal for at least a first party and a second party corresponding to a period of time further comprises:

allowing a third party to set said quantified interaction goal for said first party and said second party.

9. The method of claim 1, further comprising reporting said current quantified accumulated interaction between said first party and said second party to a third party.

10. The method of claim 1, wherein said quantified interaction goal reflects a target amount of total interaction between said first party and either said second party or a third party.

11. The method of claim 1, wherein said quantified interaction goal reflects a target amount of total interaction between said first party and either said second party or a third party.

12. A method of managing relationships in a social network service implemented by at least one processor, said method comprising:

establishing with said at least one processor a quantified interaction goal for at least a first party and a second party corresponding to a period of time, comprising;

receiving a proposed quantified interaction goal from said first party;

determining whether said second party consents to said proposed quantified interaction goal; and establishing said proposed quantified interaction goal as said quantified interaction goal if said second party consents to said proposed quantified interaction goal;

tracking with said at least one processor a current accumulated interaction score for a relationship between said first party and said second party as a sum of weighted interaction values assigned to previously performed activities in said period of time involving communication between said first party and said second party;

determining with said at least one processor, prior to an expiration of said period of time, that said current accumulated interaction score is inconsistent with said quantified interaction goal; and automatically performing a remedial action with said at least one processor to facilitate adjusting said current accumulated interaction score between said first party and said second party to a value consistent with said quantified interaction goal.

13. The method of claim 12, wherein said automatically performing a remedial action with said at least one processor to facilitate adjusting said current accumulated social interaction score between said first party and said second party to a value consistent with said quantified interaction goal further comprises:

prompting at least one of said first party and said second party to initiate an interaction activity between said first party and said second party.

14. The method of claim 13, wherein said automatically performing a remedial action with said at least one processor to facilitate adjusting said current accumulated social interaction score between said first party and said second party to a value consistent with said quantified interaction goal further comprises:

initiating an interaction activity between said first party and said second party.

15. The method of claim 13, wherein said performing a remedial action with said at least one processor to facilitate adjusting said accumulated interaction between said first party and said second party to a level consistent with said quantified interaction goal further comprises:

reducing access by one of said first party and said second party to the other of said first party and said second party.

16. The method of claim 12, wherein said establishing with said a least one processor a quantified interaction goal for at least a first party and a second party corresponding to a period of time further comprises:

automatically determining a value for said quantified interaction goal based on a relationship between said first party and said second party through said social network service implemented by said at least one processor.

17. The method of claim 12, wherein said establishing with said at least one processor a quantified interaction goal for at least a first party and a second party corresponding to a period of time further comprises:

allowing a third party to set said quantified interaction goal for said first party and said second party.

18. The method of claim 12, further comprising reporting said current quantified accumulated interaction score to a third party.

19. A system, comprising:

a processor; and a memory communicatively coupled to said processor; said memory comprising executable code stored thereon such that said processor, upon executing said executable code, is configured to:

establish a quantified interaction goal for at least a first party and a second party corresponding to a period of time;

determine, prior to an expiration of said period of time, that a current quantified accumulated interaction between said first party and said second party is inconsistent with said quantified interaction goal; and automatically perform a remedial action to facilitate adjusting said quantified accumulated interaction between said first party and said second party to a level consistent with said quantified interaction goal.

20. The system of claim 19, wherein said processor is communicatively coupled to a computing device corresponding to said first party and a computing device corresponding to said second party through a network.

21. The system of claim 19, wherein said processor is further configured to implement a social network service of which said first party and said second party are members.

22. The system of claim 19, wherein said current quantified accumulated interaction between said first party and said second party is a current accumulated interaction score comprising a sum of weighted interaction values assigned to previously performed activities in said period of time involving communication between said first party and said second party.

23. The system of claim 19, wherein said quantified interaction goal reflects a target amount of total interaction between said first party and either said second party or a third party.

24. A computer program product for managing relationships in a social network service, the computer program product comprising:

a non-transitory computer readable storage medium having computer readable program code embodied therewith, the computer readable program code comprising:

computer readable program code configured to establish a quantified interaction goal for at least a first party and a second party corresponding to a period of time;

computer readable program code configured to determine, prior to an expiration of said period of time, that a current quantified accumulated interaction between said first party and said second party is inconsistent with said quantified interaction goal; and computer readable program code configured to automatically perform a remedial action to facilitate adjusting said quantified accumulated interaction between said first party and said second party to a level consistent with said quantified interaction goal.

\* \* \* \* \*